United States Patent Office 2,883,411
Patented Apr. 21, 1959

2,883,411

PRODUCTION OF HETEROCYCLIC PHOSPHORUS-CONTAINING COMPOUNDS

William M. Lanham, Charleston, W. Va., assignor to Union Carbide Corporation, a corporation of New York No Drawing. Application June 18, 1953
Serial No. 362,676

8 Claims. (Cl. 260—461)

This invention relates to the production of novel 6-membered heterocyclic phosphorus-containing compounds; and to a novel process for producing 2-halogen-substituted alkyl derivatives of 2-oxo-1,3,2-dioxaphosphorinanes containing four oxygen atoms directly connected with the phosphorus atom of the ring. These heterocyclic compounds may be designated by the formula

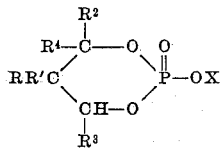

wherein R, R', $R^2$, $R^3$ and $R^4$, respectively, represent hydrogen or an alkyl group; and X represents a halogen-substituted alkyl group.

These heterocyclic phosphorus-containing esters are good solvents and softening agents for many resins and are especially useful as plasticizers in resin compositions where fireproofing is desired. They also have utility in insecticidal and fungicidal compositions; and are useful intermediates for the production of various new compounds.

In accordance with this invention these compounds are made by reacting a 2-halo-2-oxo-1,3,2-dioxaphosphorinane or a 2-halo-ring carbon alkyl-substituted 2-oxo-1,3,2-dioxaphosphorinane having a structure represented by the formula

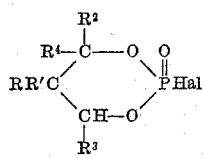

wherein R, R', $R^2$, $R^3$ and $R^4$ have the designations recited herein, and Hal represents a halogen, preferably chlorine and bromine, with an oxirane of the formula

wherein R is hydrogen or an alkyl, chlorine-substituted alkyl or bromine-substituted alkyl radical, preferably at elevated temperatures, in the presence as catalyst for the addition reaction involved, of a small amount, commonly around 3%, based upon the phosphorus-containing reactant, of certain halogen-containing compounds of titanium and of zirconium. Stannic chloride, aluminum chloride and ferric chloride can be used less effectively. The amount of catalyst is not critical and can vary considerably. As little as 0.3% thereof, based upon the weight of the phosphorus-containing reactant, has given good yields of the desired products, as shown in the accompanying examples. Reaction temperatures within the range from 25° C. to 125° C. or higher can be effectively used, while temperatures within the range from 50° C. to 70° C. are preferred in general. Preferably the oxirane compound is added in successive small amounts to a solution of the catalyst in the 2-halo-substituted-2-oxo-1,3,2-dioxaphosphorinane. The addition is slow enough to prevent the accumulation in the reaction mixture of unreacted oxirane.

An excess of the oxirane compound commonly is used, ranging from 5% to 100% or more, by weight, of the amount theoretically required, in order to insure that all of the halogen directly connected with the phosphorus atom of the phosphorus compound has reacted. However the amount of the oxirane compound theoretically required can be used.

The products of the reaction can be recovered in purified form by any of several procedures. Thus, the reaction mixture can be neutralized with an aqueous solution of trisodium citrate, which forms a water-soluble complex with the catalyst, and the organic layer then is washed with water to remove the complex. The washed product is freed from water by vacuum distillation. The desired product also can be secured directly from the reaction mixture by vacuum distillation. Also the reaction mixture can be neutralized with an aqueous slurry of calcium or barium carbonate or hydroxide, the mixture filtered, the filtrate fractionally distilled under vacuum, and the desired product separately recovered. According to another method the reaction mixture, preferably after stripping unreacted alkylene oxide, is made alkaline with a solution of a caustic alkali or the equivalent, filtered, the filtrate washed with water until neutral, and then fractionally distilled under vacuum.

The 2-halogen-substituted-2-oxo-1,3,2-dioxaphosphorinanes useful as starting materials in the process include those of the formula

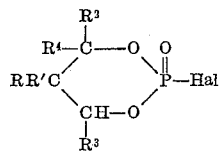

wherein R, R', $R^2$, $R^3$, and $R^4$ respectively, represent hydrogen or an alkyl group; and Hal represents chlorine or bromine.

Such halogen-substituted phosphorus compounds conveniently are made by the dropwise addition to phosphoryl chloride of an alkane-1,3-diol, such as propanediol-1,3; butanediol-1,3; pentanediol-2,4; 2-ethyl-hexanediol-1,3; and 2-ethyl-2-butyl-propanediol-1,3; preferably in approximately equimolar proportions, or to a solution of such phosphoryl chloride in an inert hydrogen chloride sequestering agent, such as pyridine, and an inert low-boiling diluent such as ethyl ether. Thus 2-chloro-5-ethyl-2-oxo-4-propyl-1,3,3-dioxaphosphorinane was prepared by slowly adding 4 mols of 2-ethyl-1,3-hexanediol during 1.75 hours to 4 mols of phosphoryl chloride held at 25° C. under 500 mm. of mercury pressure. The pressure was reduced to 350 mm. of mercury for one hour and then was reduced to 5 mm. of mercury and held overnight at 25° C., thus eliminating the hydrogen chloride from the desired product.

Among suitable 2 - halo - 2 - oxo - 1,3,2 - dioxaphosphorinanes useful in the process may be mentioned 2-chloro - 4 - methyl - 2-oxo-1,3,2-dioxaphosphorinane, 2-chloro - 4,6 - dimethyl - 2-oxo-1,3,2-dioxaphosphorinane, 2 - chloro - 5 - ethyl - 2 - oxo - 4 - propyl - 1,3,2 - dioxaphosphorinane; 5 - butyl - 2-chloro-5-ethyl-2-oxo-1,3,2-dioxaphosphorinane; 2 - chloro - 2 - oxo - 4,4,6 - trimethyl-1,3,2 - dioxaphosphorinane; and 2-chloro-2-oxo-1,3,2-dioxaphosphorinane.

Oxirane compounds useful include the alkylene oxides such as ethylene oxide, alpha-propylene oxide, isopropyl ethylene oxide, epichlorohydrin, epibromohydrin and epiiodohydrin.

The preferred catalysts are the tetrachlorides and tetrabromides of titanium and zirconium. It is possible to use other compounds of these metals capable of forming halides of the metals when dissolved in the 2-oxo-1,3,2-dioxaphosphorinane starting materials.

The halides of other metals, such as those of aluminum, tin and iron are capable of catalyzing the reaction but suffer from the disadvantage that reactions involving their use are difficult to control and are hazardous.

The following examples serve to illustrate the invention:

*Example 1*

During 35 minutes 30 grams of gaseous ethylene oxide were slowly diffused into a solution of 4 grams of titanium tetrachloride in 113 grams (0.5 mol) of 2-chloro-5-ethyl-2-oxo-4-propyl-1,3,2-dioxaphosphorinane maintained at 50° C. The reaction mixture then was heated at 50° C. for two hours longer, and finally was stripped by distillation to a kettle temperature of 50° C. under a pressure of less than 2 mm. of mercury. It was found that 23 grams of ethylene oxide had reacted with the phosphorus-containing compound.

The stripped residue was made alkaline by the addition of a solution of 20 grams of caustic soda in 100 cc. of water, stirred for 0.5 hour at room temperature and filtered. The filtrate was washed with water until neutral to litmus. The organic layer which separated was stripped by distillation to a kettle temperature of 100° C. under a pressure of less than 2 mm. of mercury. The residual 2 - (2 - chloroethoxy) - 5 - ethyl - 2 - oxo - 4 - propyl - 1,3,2-dioxaphosphorinane,

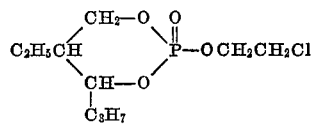

had the following properties: $n_D^{30}$=1.4625; mol. wt.= 284.08 (theory=270.7); acidity=0.005 cc. of a normal solution of a base per gram; analysis, percent by weight, carbon, 44.17%; phosphorus, 11.58%; chlorine, 12.54%; hydrogen, 7.27%. The yield of product was 54%, based upon the phosphorus-containing reactant.

*Example 2*

Following the general procedure described in Example 1 but using 4 grams of zirconium tetrachloride as the catalyst there were secured 113 grams of 2-(2-chloroethoxy)-5-ethyl-2-oxo-4-propyl-1,3,2-dioxaphosphorinane as a clear pale yellow liquid having a specific gravity at 25°/15°=1.190; and $n_D^{30}$=1.4617. A yield of 84%, based upon the phosphorus-containing reactant, was secured.

*Example 3*

To an agitated solution of 113 grams (0.5 mol) of 2-chloro - 5 - ethyl - 2 - oxo - 4 - propyl - 1,3,2 - dioxaphosphorinane and 4 grams of zirconium tetrachloride there were added dropwise during 0.5 hour 58 grams (1 mol) of propylene oxide while cooling to maintain a temperature of 50° C. After heating the mixture for two additional hours at 50° C. it was neutralized by washing with two successive 150 gram portions of 10% aqueous trisodium citrate, and then with water. It was then stripped by pot distillation to a kettle temperature of 100° C. under a pressure of less than 2 mm. of mercury. The slightly yellow residual liquid 2-(2-chloropropoxy)-5-ethyl-2-oxo-4-propyl-1,3,2-dioxaphosphorinane,

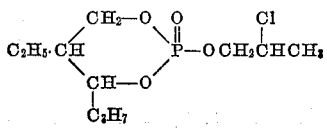

had a specific gravity at 25°/15°=1.166; $n_D^{30}$=1.4592; weight percent chlorine=12.94 (theory 12.46).

*Example 4*

Following the general procedure described in Example 3 but using as the catalyst 1 gram of titanium tetrachloride, the almost colorless residual liquid 2-(2-chloropropoxy) - 5 - ethyl-2-oxo-4-propyl-1,3,2-dioxaphosphorinane had a specific gravity at 25°/15°=1.168; $n_D^{30}$=1.4597; percent chlorine by weight=12.76 (theory=12.46). A yield of 86%, based upon the phosphorus-containing reactant, was obtained.

*Example 5*

To an agitated solution of 1 gram of titanium tetrachloride in 113 grams (0.5 mol) of 2-chloro-5-ethyl-2-oxo-4-propyl-1,3,2-dioxaphosphorinane there were added during one hour 93 grams (1 mol) of epichlorohydrin. During this period and for an additional two hours the mixture was maintained at 70° C. The mixture then was neutralized using 100 grams of 10% aqueous trisodium citrate, washed with water, and stripped by pot distillation to a kettle temperature of 100° C. under a pressure of less than 1 mm. of mercury. The almost colorless liquid residual 2-(2,3-dichloropropoxy)-5-ethyl-2-oxo-4-propyl-1,3,2-dioxaphosphorinane

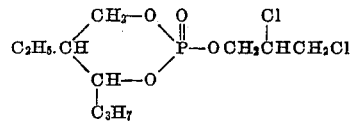

had the following properties: Specific gravity at 25°/15° =1.239; $n_D^{30}$=1.4725; weight percent chlorine=21.36 (theory=22.21). A yield of 86%, based upon the phosphorus-containing reactant, was secured.

*Example 6*

To an agitated solution of 1 gram of titanium tetrachloride in 317 grams (1.86 mols) of 2-chloro-4-methyl-2-oxo-1,3,2,-dioxaphosphorinane were added slowly 115 grams (2.6 mols) of gaseous ethylene oxide while maintaining a temperature of 30° to 40° C. Thereafter 30 grams of excess ethylene oxide were removed by pot distillation to a kettle temperature of 50° C. under 2 mm. of mercury pressure, indicating that 1.9 mols of ethylene oxide had reacted. The catalyst was removed by stirring the reaction mixture with a slurry of calcium carbonate in water and filtering. The filtrate was stripped by pot distillation to a kettle temperature of 70° C. under 2 mm. of mercury pressure, and then was distilled at 80° C. under a pressure of 25 microns of mercury, using a falling film type still. The colorless distillate, 2-(2-chloroethoxy)-4-methyl-2-oxo-1,3,2-dioxaphosphorinane

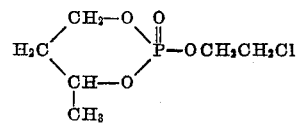

had the following properties: specific gravity at 30°/15° C.=1.313; $n_D^{30}$=1.4596.

*Example 7*

2 - (2 - chloropropoxy) - 2 - oxo - 4,4,6 - trimethyl - 1,3,2-dioxaphosphorinane was prepared by the dropwise addition of 20 g. (0.34 mol) of propylene oxide to an agitated solution of 0.5 g. of titanium tetrachloride and 50 grams (0.25 mol) of 2-chloro-2-oxo-4,4,6-trimethyl-1,3,2-dioxaphosphorinane. The addition was conducted at a reaction temperature of 50° C. over a period of 15 minutes with cooling. After the addition the reaction mixture was stirred at 50° C. for 2 additional hours and then stripped by distillation at 60° C. under a pressure of less than 2 mm. of mercury. A 14.5 gram (theory= 14.5 g.) gain in weight was obtained. The reaction mixture was washed with 100 grams of a 10% aqueous solution of trisodium citrate, washed once with water, and then stripped by distillation at 60° C. under a pressure of less than 2 mm. of mercury. The fluid residue product, $$\begin{array}{c} CH_3 \quad CH_3 \\ \diagdown C\!-\!O \quad O \\ CH_2 \diagup \qquad \diagdown \overset{\|}{P}OCH_2CHCH_3 \\ \diagdown C\!-\!O \diagup \qquad \quad | \\ H \diagup \diagdown CH_3 \qquad \qquad Cl \end{array}$$

had the following properties: $n_D^{30}=1.4605$, acidity=0.04 cc. of a normal base/g.; percent Cl, by weight=13.46 (theory=13.82).

Example 8

2 - (2 - bromopropoxy) - 5 - butyl - 5 - ethyl - 2 - oxo - 1,3,2-dioxaphosphorinane was prepared by dropping 23 grams (0.4 mol) of propylene oxide into a solution of 47 grams of 2-bromo-5-butyl-5-ethyl-2-oxo-1,3,2-dioxaphosphorinane (0.165 mol) and 1.3 grams of titanium tetrachloride. The addition was made over a period of 30 minutes with cooling to maintain the temperature at 70° C. After the addition the reaction mixture was maintained at 70° C. for 30 minutes and then stripped by distillation at 40° C. under a pressure of 2 mm. of mercury. The net gain in weight was 9.7 gram (theory= 9.5). Fifty cc. of ethyl ether were added and the reaction mixture washed with a solution consisting of 15 grams of trisodium citrate and 30 cc. of water, then with 4–50 cc. portions of water, and stripped by distillation at 100° C. under a pressure of 2 mm. of mercury. The residue product $$\begin{array}{c} \qquad CH_2\!-\!O \quad O \\ \diagup \qquad \diagdown \overset{\|}{P}\!-\!OCH_2CHBrCH_3 \\ H_9C_4\!-\!C\!-\!C_2H_5 \diagdown \qquad \diagup \\ \diagdown CH_2\!-\!O \diagup \end{array}$$

was found to have the following properties: $n_D^{30}=1.4726$, acidity=0.006 cc. of a normal base/g., percent Br=22.91 (theory=23.28), percent yield=70.7, based on phosphorous-containing reactant.

The invention is susceptible of modification within the scope of the appended claims.

I claim:
1. As new products, 2-halogen-substituted alkyl derivatives of 2-oxo-1,3,2-dioxaphosphorinanes, such products being designated by the formula:

$$\begin{array}{c} R^4 \quad R^2 \\ \diagdown C\!\!-\!\!O \quad O \\ RR'C \diagup \qquad \diagdown \overset{\|}{P}\!-\!OX \\ \diagdown CH\!-\!O \diagup \\ \qquad | \\ \qquad R^3 \end{array}$$

wherein R, R', $R^2$, $R^3$, and $R^4$ respectively represent a radical of the class consisting of hydrogen and the alkyl radicals; and X represents a radical of the class consisting of the chlorine-substituted and bromine-substituted alkyl radicals.

2. As new compounds, 2 - oxo - 1,3,2 - dioxaphosphorinane and the ring carbon alkyl-substituted 2-oxo-1,3,2-dioxaphosphorinanes, said compounds respectively having a haloalkoxy radical directly attached to the phosphorus atom.

3. As new compounds, 2-oxo-1,3,2-dioxaphosphorinane and the ring carbon alkyl-substituted 2-oxo-1,3,2-dioxaphosphorinanes, said compounds respectively having a 2-chloroethoxy radical directly attached to the phosphorus atom.

4. As new compounds, 2-oxo-1,3,2-dioxaphosphorinane and the ring carbon alkyl-substituted 2-oxo-1,3,2-dioxaphosphorinanes, said compounds respectively having a 2-chloropropoxy radical directly attached to the phosphorus atom.

5. As new compounds, 2-oxo-1,3,2-dioxaphosphorinane and the ring carbon alkyl-substituted 2-oxo-1,3,2-dioxaphosphorinanes, said compounds respectively having a 2,3-dichloropropoxy radical directly attached to the phosphorus atom.

6. Process for preparing 2-haloalkoxy derivatives of the 2-oxo-1,3,2-dioxaphosphorinanes which comprises reacting an oxirane of the formula $$\begin{array}{c} CH_2CHR \\ \diagdown \diagup \\ O \end{array}$$

wherein R is a member of the class consisting of hydrogen and the alkyl, chlorine-substituted alkyl and bromine-substituted alkyl radicals, with a phosphorus compound of the formula $$\begin{array}{c} R^4 \quad R^2 \\ \diagdown C\!\!-\!\!O \quad O \\ RR'C \diagup \qquad \diagdown \overset{\|}{P}\!-\!Hal \\ \diagdown CH\!-\!O \diagup \\ \qquad | \\ \qquad R^3 \end{array}$$

wherein R, R', $R^2$, $R^3$, and $R^4$ respectively, designate a member of the class consisting of hydrogen and the alkyl groups, and Hal designates a member of the class consisting of chlorine and bromine, in the presence of a metal halide catalyst for the addition reaction involved, selected from the class consisting of the halides of titanium and zirconium, and recovering from the resultant reaction mixture the 2-haloalkoxy-2-oxo-1,3,2-dioxaphosphorinane thus produced.

7. Process for preparing 2-haloalkoxy derivatives of the 2-oxo-1,3,2-dioxaphosphorinanes, which comprises reacting at an elevated temperature and oxirane of the formula $$\begin{array}{c} CH_2CHR \\ \diagdown \diagup \\ O \end{array}$$

wherein R is a member of the class consisting of hydrogen and the alkyl, chlorine-substituted alkyl and bromine-substiuted alkyl radicals; with a phosphorus compound of the formula $$\begin{array}{c} R^4 \quad R^2 \\ \diagdown C\!\!-\!\!O \quad O \\ RR'C \diagup \qquad \diagdown \overset{\|}{P}\!-\!Hal \\ \diagdown CH\!-\!O \diagup \\ \qquad | \\ \qquad R^3 \end{array}$$

wherein R, R', $R^2$, $R^3$, and $R^4$, respectively, designate a member of the class consisting of hydrogen and the alkyl groups, and Hal designates a member of the class consisting of chlorine and bromine, in the presence as catalyst of a metal halide of the class consisting of the halides of titanium and zirconium, and recovering from the resultant reaction mixture the 2-haloalkoxy-2-oxo-1,3,2-dioxaphosphorinane thus produced.

8. Process as defined in claim 7 wherein the said oxirane is fed in small successive amounts to the phosphorus-containing reactant, and the reaction is conducted at temperatures within the range from 25° C. to about 125° C.

References Cited in the file of this patent
UNITED STATES PATENTS

| 1,936,985 | Lommel | Nov. 28, 1933 |
| 2,157,164 | Daly et al. | May 9, 1939 |
| 2,610,978 | Lanham | Sept. 16, 1952 |
| 2,661,365 | Gamrath et al. | Dec. 1, 1953 |
| 2,661,366 | Gamrath et al. | Dec. 1, 1953 |

OTHER REFERENCES

Mitchell at al.: JACS, 72, page 5779 (1950).